(12) United States Patent
Ioffe

(10) Patent No.: US 9,092,859 B1
(45) Date of Patent: *Jul. 28, 2015

(54) SYSTEMS AND METHODS FACILITATING RANDOM NUMBER GENERATION FOR HASHES IN VIDEO AND AUDIO APPLICATIONS

(71) Applicant: Google Inc., Mountain View, CA (US)

(72) Inventor: Sergey Ioffe, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/281,463

(22) Filed: May 19, 2014

Related U.S. Application Data

(63) Continuation of application No. 13/355,514, filed on Jan. 21, 2012, now Pat. No. 8,781,154.

(51) Int. Cl.
  *G06K 9/00* (2006.01)
  *G06T 1/00* (2006.01)
  *B42D 15/00* (2006.01)
  *G06F 7/00* (2006.01)

(52) U.S. Cl.
  CPC .................................. *G06T 1/0021* (2013.01)

(58) Field of Classification Search
  CPC .................................. G06K 9/00; G06T 1/00
  USPC .......... 382/100, 116, 124, 126; 707/698, 747, 707/770; 725/18; 183/68, 78
  See application file for complete search history.

(56) References Cited

U.S. PATENT DOCUMENTS

| | | | |
|---|---|---|---|
| 6,469,103 B1 | 10/2002 | Jain et al. | |
| 7,289,643 B2 * | 10/2007 | Brunk et al. | 382/100 |
| 7,668,790 B2 | 2/2010 | Barbu et al. | |
| 7,912,244 B2 * | 3/2011 | Mihcak et al. | 382/100 |
| 8,341,180 B1 | 12/2012 | Arumugam et al. | |
| 8,781,154 B1 * | 7/2014 | Ioffe | 382/100 |

OTHER PUBLICATIONS

P2P File Sharing. "Altnet Launches Global File Registry." Aug. 3, 2011, 3 pages, http://www.p2p.weblog.com/50226711/altnet_launches_global_file_registry.php, Last accessed Apr. 24, 2012.

(Continued)

*Primary Examiner* — Abolfazl Tabatabai
(74) *Attorney, Agent, or Firm* — Amin, Turocy & Watson, LLP

(57) ABSTRACT

Systems and methods facilitating random number generation of hashes for video and/or audio are provided. In one embodiment, a system can include: a memory, and a microprocessor that executes computer executable components. The components can include a weighted distribution generation component that can generate a sampling distribution of a weighted combination of uniform distributions, and obtain a sample value from the sampling distribution. In one embodiment, horizontal regions of substantially equal area can be identified. The sample value can be obtained by selecting one of the horizontal regions, and uniformly selecting a coordinate from the horizontal region. The coordinate can correspond to a value on a horizontal axis of the sampling distribution, and the value can be equal to a sample value. The sample value can be employed to compute a hash employed in video and/or audio fingerprinting and/or in computing image descriptors for video.

34 Claims, 11 Drawing Sheets

(56) References Cited

OTHER PUBLICATIONS

Global File Registry, May 26, 2006, 20 pages, Draft 1, http://www.globalfileregistry.com/assets/Global_File_Registry_White_Paper.pdf, Last accessed Apr. 24, 2012.

"Ziggurat algorithm," Wikipedia, 5 pages, http://en.wikipedia.org/wiki/Ziggurat_algorithm, Last accessed Nov. 7, 2011.

Lu, Jian, "Video Fingerprinting and Applications: a review," Media Forensics & Security Conference, Vobile, Inc., San Jose, CA, http://www.slideshare.net/jianlu/videofingerprintingspiemfs09d, Last accessed May 30, 2012.

Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed May 30, 2012.

Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed May 30, 2012.

Lu, Jian, "Video fingerprinting for copy identification: from research to industry applications," Proceedings of SPIE-Media Forensics and Security XI, vol. 7254, Jan. 2009, http://idm.pku.edu.cn/jiaoxue-MMF/2009/VideoFingerprinting_SPIE-MFS09.pdf, Last accessed May 30, 2012.

Office Action for U.S. Appl. No. 13/355,514, dated Jun. 21, 2013, 24 pages.

Office Action for U.S. Appl. No. 13/355,514, dated Nov. 5, 2013, 17 pages.

Notice of Allowance for U.S. Appl. No. 13/355,514, dated Mar. 3, 2014, 18 pages.

\* cited by examiner

SYSTEMS AND METHODS FACILITATING RANDOM NUMBER GENERATION FOR HASHES IN VIDEO AND AUDIO APPLICATIONS

CROSS-REFERENCE TO RELATED APPLICATIONS

This application is a continuation of U.S. patent application Ser. No. 13/355,514 (which is now U.S. Pat. No. 8,781,154), filed Jan. 21, 2012 and entitled, "SYSTEMS AND METHODS FACILITATING RANDOM NUMBER GENERATION FOR HASHES IN VIDEO AND AUDIO APPLICATIONS," the entirety of which is incorporated herein by reference.

TECHNICAL FIELD

This disclosure relates to random number generation, in general, and to random number generation for hashes in video and audio applications, in particular.

BACKGROUND

Video and/or audio processing methods employ fingerprinting to identify and extract a video and/or audio (or portions thereof). For example, a video, or portions of the video, can be employed in comparing videos and/or video data. To generate fingerprints, hashes are typically generated from random numbers. Unfortunately, the process for generating random numbers can be time-consuming and process intensive. Especially challenging is the fact that a plethora of random numbers are typically generated, which can magnify problems associated with inefficiency in random number generation. For example, conventional sampling techniques typically involve verifying a sample against a distribution from which the sample is taken. In some cases, the sample is rejected and another sample must then be taken. Normally, a few percent (e.g. approximately 3%) of samples are rejected and need to be re-sampled. Unfortunately, although re-sampling is an infrequent event, the rejection approach typically requires computer code or hardware to implement a conditional, e.g., used in a loop. The presence of the condition can make pipelining difficult since pipelining works best when the computation being pipelined takes a fixed number of central processing unit (CPU) cycles. Accordingly, systems and methods for efficient random number generation are desired.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

Systems and methods in this disclosure relate to random number generation. The random numbers can be employed in generating hashes for media, thereby facilitating fingerprinting. In some embodiments, for example, a method of random number generation includes determining a sample value. The determining the sample value can include: generating a sampling distribution comprised of a weighted combination of a plurality of uniform distributions; and determining the sample value from the sampling distribution. The method can also include computing a hash based at least on the sample value; and providing the hash to a fingerprinting system for generation of a fingerprint for a media, the fingerprint being based on the hash.

In one or more embodiments, the disclosed subject matter relates to a fingerprinting system. The system can include: a memory that stores computer executable components; and a microprocessor that executes computer executable components stored in the memory. The components can include: a communication component that receives media; and a fingerprinting component that generates a fingerprint for the media. The fingerprint can be based on a hash, and the fingerprinting component can also employ a random number generation system that can compute the hash. Computation of the hash can include: generation of a sampling distribution composed of a weighted combination of a plurality of uniform distributions; and identification of a plurality of horizontal regions of substantially equal area under a curve of the sampling distribution. The bottommost one of the plurality of horizontal regions is bounded by a same set of boundaries as one of the plurality of horizontal regions immediately above the bottommost one of the plurality of horizontal regions. Computation of the hash can also include: selection of one of the plurality of horizontal regions; uniform selection of a coordinate based on a selected one of the plurality of horizontal regions (the coordinate corresponding to a value on a horizontal axis of the sampling distribution), and determining the value corresponding to the coordinate, the value being equal to a sample value.

In another embodiment, the disclosed subject matter relates to a method facilitating fingerprinting. The method can include receiving media; and determining a hash, the hash being based, at least, on a computed sample value. Computing the sample value can include: generating a sampling distribution, the generating comprising excluding tails of a probability distribution function (PDF). Computing the sample value can also include: identifying horizontal regions of substantially equal area under a curve of the sampling distribution. A bottommost one of the horizontal regions can be bounded by the same set of boundaries as the horizontal region immediately above the bottommost horizontal region. Computing the sample value can also include: selecting one of the plurality of horizontal regions; and uniformly selecting a coordinate from a selected one of the plurality of horizontal regions. The coordinate can correspond to a value on a horizontal axis of the sampling distribution. Computing the sample value can then include determining the value corresponding to the coordinate, the value being equal to a sample value. After computation of the hash, the method can include generating a fingerprint for the media based on the hash.

In one or more embodiments, the disclosed subject matter relates to a method facilitating random number generation for computation of hashes. The method can include generating a sampling distribution comprised of a weighted combination of a plurality of uniform distributions; and obtaining a sample value from the sampling distribution.

In another embodiment, the disclosed subject matter relates to a system that facilitates random number generation for computation of hashes. The system can include: a memory that stores computer executable components; and a microprocessor that executes computer executable components. The components can include a weighted distribution generation component that: generates a sampling distribution including a weighted combination of uniform distributions, and obtains a sample value from the sampling distribution.

In another embodiment, the disclosed subject matter relates to a non-transitory computer storage medium storing computer-executable instructions that, when executed on a processor, cause the processor to perform operations. The operations include: generating a sampling distribution comprised of a weighted combination of a plurality of uniform distributions; and obtaining a sample value from the sampling distribution.

Toward the accomplishment of the foregoing and related ends, the one or more embodiments include the features hereinafter fully described and particularly pointed out in the claims. The following description and the annexed drawings set forth in this disclosure detail certain illustrative aspects of the one or more embodiments. These aspects are indicative, however, of but a few of the various ways in which the principles of various embodiments can be employed, and the described embodiments are intended to include all such aspects and their equivalents.

DETAILED DESCRIPTION

Figure 1:
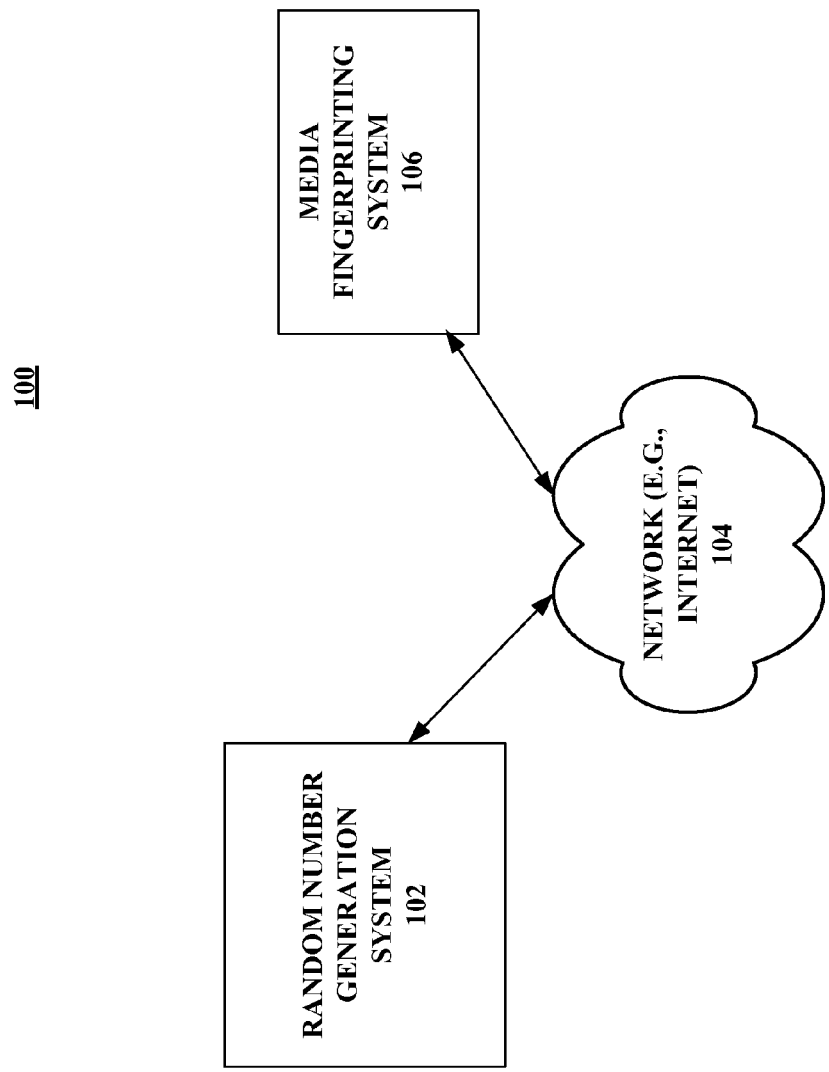
FIG. 1 is an illustration of a block diagram of an exemplary non-limiting system that facilitates random number generation for computation of a hash for video or audio.

Various embodiments are now described with reference to the drawings, wherein like reference numerals are used to refer to like elements throughout. In the following description, for purposes of explanation, numerous specific details are set forth in order to provide a more thorough understanding of one or more embodiments. It is evident, however, that such embodiments can be practiced without these specific details. In other instances, structures and devices are shown in block diagram form in order to facilitate describing one or more embodiments.

Systems and methods described in this disclosure relate to random number generation for computation of a hash for video or audio. The systems and methods can advantageously be employed to efficiently generate random numbers for use in computation of the hashes. For example, in one embodiment, a method can include generating a sampling distribution comprised of a weighted combination of a plurality of uniform distributions. The method can include obtaining a sample value from the sampling distribution. The systems and methods employed in this disclosure facilitate the generation of a random number as a result of a fixed number of instructions, with no conditionals or loops. As such, these random number generations can be pipelined or performed via parallel execution. The hashes can be employed in various processing techniques including, but not limited to, video and/or audio fingerprinting, and/or for computation of image descriptors in images or video.

FIG. 1 is an illustration of a block diagram of an exemplary non-limiting system that facilitates random number generation for computation of a hash. The hash can be for video and/or audio fingerprinting in various embodiments. System 100 can include a random number generation (RNG) system 102. In various embodiments, as shown, the system 100 can also include a media fingerprinting (MF) system 106. For example, the media can include video and/or audio. The RNG system 102 can generate a random number that can be employed in generating a hash for the MF system 106 as described in further detail below. The hash can be employed to generate a fingerprint for a video (or for audio) received and/or processed by the MF system 106. The RNG system 102 and the MF system 106 can be communicatively coupled to one another via a network 104 in some embodiments. The network can include the internet in some embodiments. In some embodiments, the RNG system 102 and MF system 106 can be located at a same location and be directly connected to one another.

Figure 2:
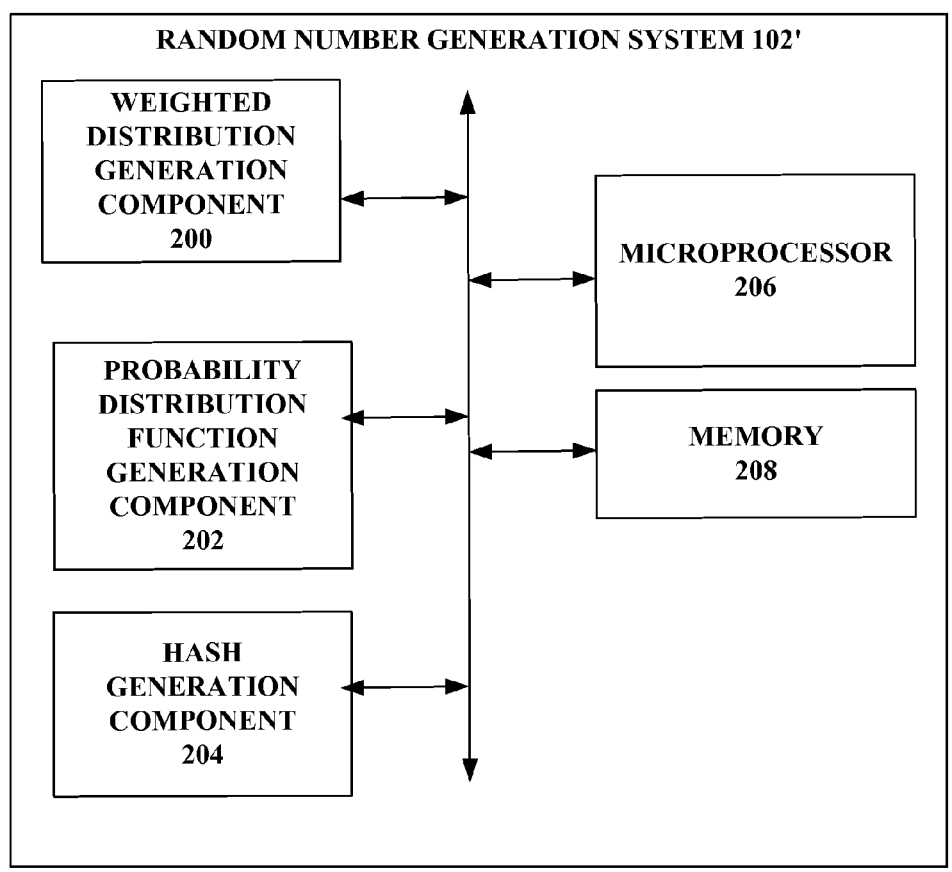
FIG. 2 is an illustration of a block diagram of an exemplary non-limiting system that facilitates random number generation for computation of a hash for video or audio.
Figure 3:
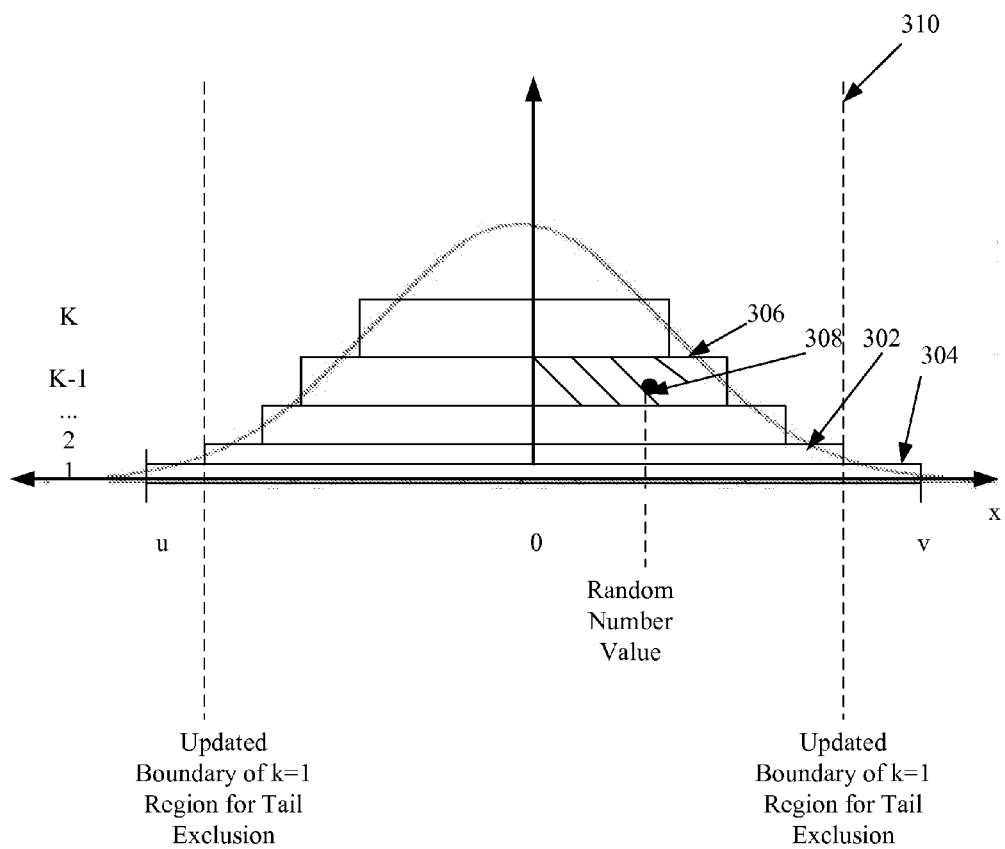
FIG. 3 is an illustration of a graph for use by an exemplary system that facilitates random number generation for computation of a hash for video or audio.

The RNG system 102 is described in greater detail, in one embodiment, with reference to FIGS. 2 and 3. FIG. 2 is an illustration of a block diagram of an exemplary non-limiting system that facilitates random number generation for computation of a hash. FIG. 3 is an illustration of a graph for use by an exemplary system that facilitates random number generation for computation of a hash. In various embodiments, the hash can be a hash for a video, for audio and/or for computation of an image descriptor of a video (or frame thereof).

Turning to FIG. 2, the RNG system 102' is one example of an embodiment of an RNG system 102. As such, one or more of the structure and/or the function of the RNG system 102' can include the structure and/or function of the RNG system 102.

The RNG system 102' can include a weighted distribution (WD) generation component 200, a probability distribution function (PDF) generation component 202, a hash generation component 204, a microprocessor 206 and/or a memory 207. The WD generation component 200, PDF generation component 202, hash generation component 204, microprocessor 206 and/or memory 207 can be electrically and/or communicatively coupled to one another to perform one or more functions of the RNG system 102'.

The WD generation component 200 can generate a sampling distribution from which a random number can be sampled. In some embodiments, the sampling distribution can be represented by a PDF that is or that includes a weighted combination of one or more uniform distributions. For example, in some embodiments, the PDF can be substantially equivalent to a Gamma (2,1) distribution and/or represented by Equation 1:

$$P(x)=Xe^{-x} \qquad \text{(Equation 1)}$$

In some embodiments, the weighted combination of one or more uniform distributions can be represented as shown in Equation 2:

$$Q(x) = (1/K)\sum_{k=1}^{K} I(u_k < x < v_k)/(v_k - u_k) \quad \text{(Equation 2)}$$

In Equation 2, I( ) can be an indicator function that is equal to a value of 1 if the condition is true, and can be equal to a value of 0 if the condition is false. Further, the variable, k, can be a value on a uniform, or Gaussian distribution, and can be bounded by 1 and K. A PDF composed of a number of uniform distributions can approximate a normal, or Gaussian distribution (shown in FIG. 3). The uniform distribution can be bounded by $u_k$ and $v_k$ in some embodiments. The value x can be a uniformly, or randomly, selected number on the interval $(u_k, v_k)$.

Accordingly, in some embodiments, the WD generation component 200 can obtain a sample value from the distribution of Equation 2. With reference to Equation 2, in some embodiments, the WD generation component 200 can sample an index value, k, on a uniform distribution between 1 and K. The WD generation component 200 can then generate a uniform random number, x, from the interval $(u_k, v_k)$ of the distribution.

In various embodiments, the PDF generation component 202 can generate one or more PDFs (e.g., P(x)) bounded by interval (u, v). While examples of P(x) are described, P(x) can be any of a number of different types of distributions as long as P(x) is (1) increasing, (2) decreasing or (3) increasing and then decreasing (e.g., has a single peak). In other embodiments, the systems and methods described in this disclosure can employ other P(x) distributions that are adapted for use (e.g., having more than one peak, with one or more portions of the distribution having additional peaks beyond one peak removed prior to generating the sampling distributions). For example, in some embodiments, P(x) can be a Gamma (2,1) function described with reference to Equation 1 above. In other embodiments, as shown, P(x) can be a normal, or Gaussian, distribution. For example, as shown in Equation 3, P(x) can be a normal, or Gaussian, distribution.

$$P(x) = \frac{1}{\sqrt{2\pi}} e^{(-x^2)/2} \quad \text{(Equation 3)}$$

Turning back to FIGS. 2 and 3, the hash generation component 204 can generate a hash based on the sample value obtained by the WD generation component 200.

Accordingly, with reference to FIG. 3, the WD generation component 200 can generate the sampling distribution 300 (e.g., Q(x)) as a PDF as described above. The WD generation component 200 can cover the area under the curve of Q(x) with K horizontal regions of substantially equal area. The WD generation component 200 can then shorten the bottommost region 304 under the curve (e.g., the k=1 region) to the length of the region 302, immediately above the bottommost region (e.g., the k=2 region). Depicting positive values of x, similarly, if Q(x) is bounded by (0, v), the bottommost region 304 (e.g., the k=1 region) can be shortened from length (0,v) to the length of the region 302 (e.g., the k=2 region). By bounding the region 304, the tails of the Gaussian distribution are removed and the efficiency with which the random number is obtained is efficient.

Next, the WD generation component 200 can select at random one of the horizontal regions. In this embodiment, for the sake of example, the region 306 corresponding to k=K−1 is selected. Next, as shown, the WD generation component 200 can uniformly select, from the selected horizontal region, a coordinate 308. The coordinate can correspond to a value on the horizontal axis (e.g., x axis) of the sampling distribution in some embodiments. In some embodiments, uniform selection can be random or pseudorandom selection. The value corresponding to the coordinate can be a random number for hash generation. By bounding the region 304 (as shown at the updated boundary 310), there is a high likelihood that the random number selected is under the curve of Q(x) and therefore the rejection step typically required in conventional approaches can be avoided.

Turning back to FIG. 2, microprocessor 206 can perform one or more of the functions described in this disclosure with reference to any of the systems and/or methods disclosed. The memory 207 can be a computer-readable storage medium storing computer-executable instructions and/or information for performing the functions described in this disclosure with reference to any of the systems and/or methods disclosed.

Figure 4:
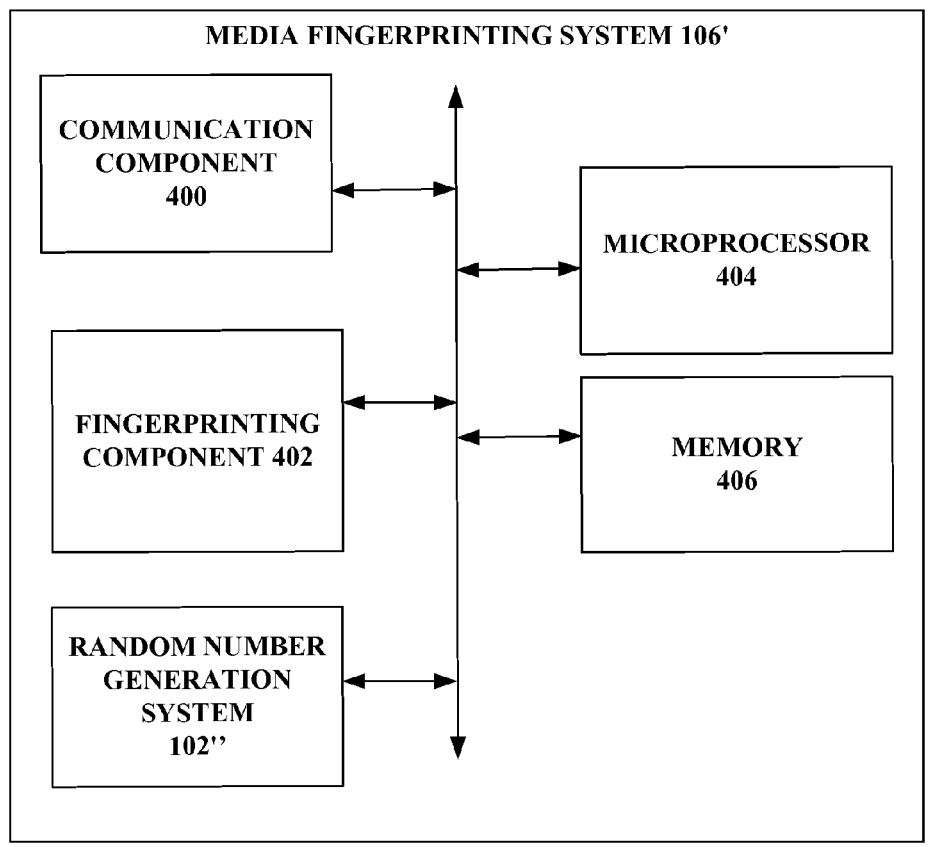
FIG. 4 is an illustration of a block diagram of an exemplary non-limiting system that facilitates media fingerprinting employing random number generation for computation of a hash for video or audio.

FIG. 4 is an illustration of a block diagram of an exemplary non-limiting system that facilitates fingerprinting employing random number generation for computation of a hash for audio and/or video. In some embodiments, one or more of the structure and/or functionality of MF system 106 is described with reference to FIGS. 1, 2, 3 and/or 4. In other embodiments, MF system 106' can include additional or alternative structure and/or functionality.

The MF system 106' can include a communication component 400, a fingerprinting component 402, a RNG system 102", a microprocessor 404 and/or a memory 406. The communication component 400, fingerprinting component 402, RNG system 102", microprocessor 404 and/or memory 406 can be electrically or communicatively coupled to perform one or more of the functions described in this disclosure.

The communication component 400 can receive media, e.g., audio, an image, or a video. The fingerprinting component 402 can generate a fingerprint for the media. The fingerprint can be based on a hash, and the fingerprinting component 402 can also employ the RNG system 102" to compute the hash. In some embodiments, the fingerprinting component 402 can employ the fingerprint for fingerprinting for the audio and/or video.

The RNG system 102" can compute the hash by generation of a sampling distribution composed of a weighted combination of a plurality of uniform distributions, and identification of horizontal regions of substantially equal area under a curve of the sampling distribution. The bottommost one of the horizontal regions can be bounded by the same set of boundaries as the horizontal region immediately above the bottommost horizontal region. To compute the hash, the RNG system 102" can select a horizontal region and select a coordinate from the selected horizontal region. The coordinate can correspond to a value on a horizontal axis (e.g., x axis) of the sampling distribution. The value can be equal to the sample value (e.g., random number). The RNG system 102" can generate the hash based, at least, on the sample value. Alternatively, the RNG system 102" can provide the sample value to the fingerprinting component 402 for generation of the hash based on the sample value.

Microprocessor 404 can perform one or more of the functions described in this disclosure with reference to any of the systems and/or methods disclosed. The memory 406 can be a computer-readable storage medium storing computer-executable instructions and/or information for performing the functions described in this disclosure with reference to any of the systems and/or methods disclosed. In some embodiments, the RNG system 102" is stored in memory 406.

Figure 5:
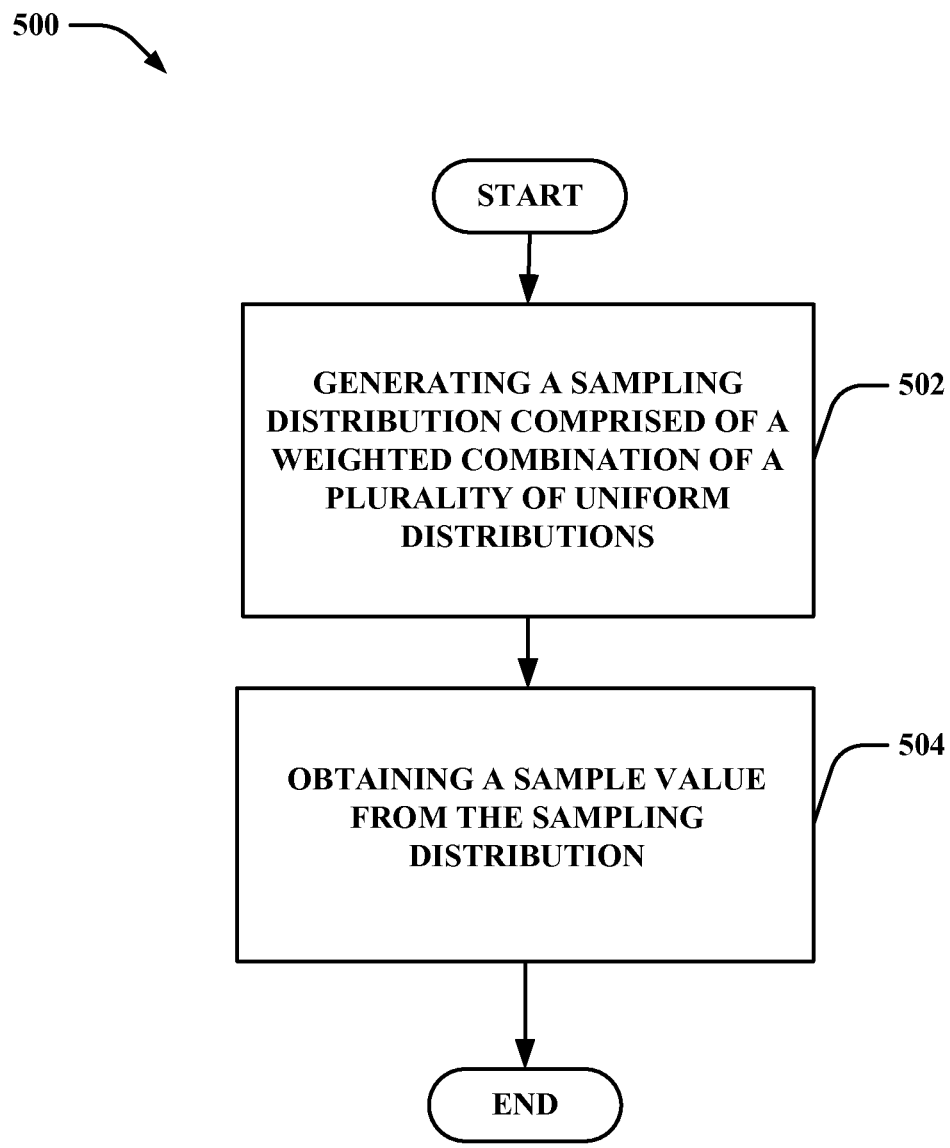
FIGS. 5, 6A and 6B are illustrations of exemplary flow diagrams of methods for facilitating random number generation for computation of a hash for video or audio.
Figure 6A:
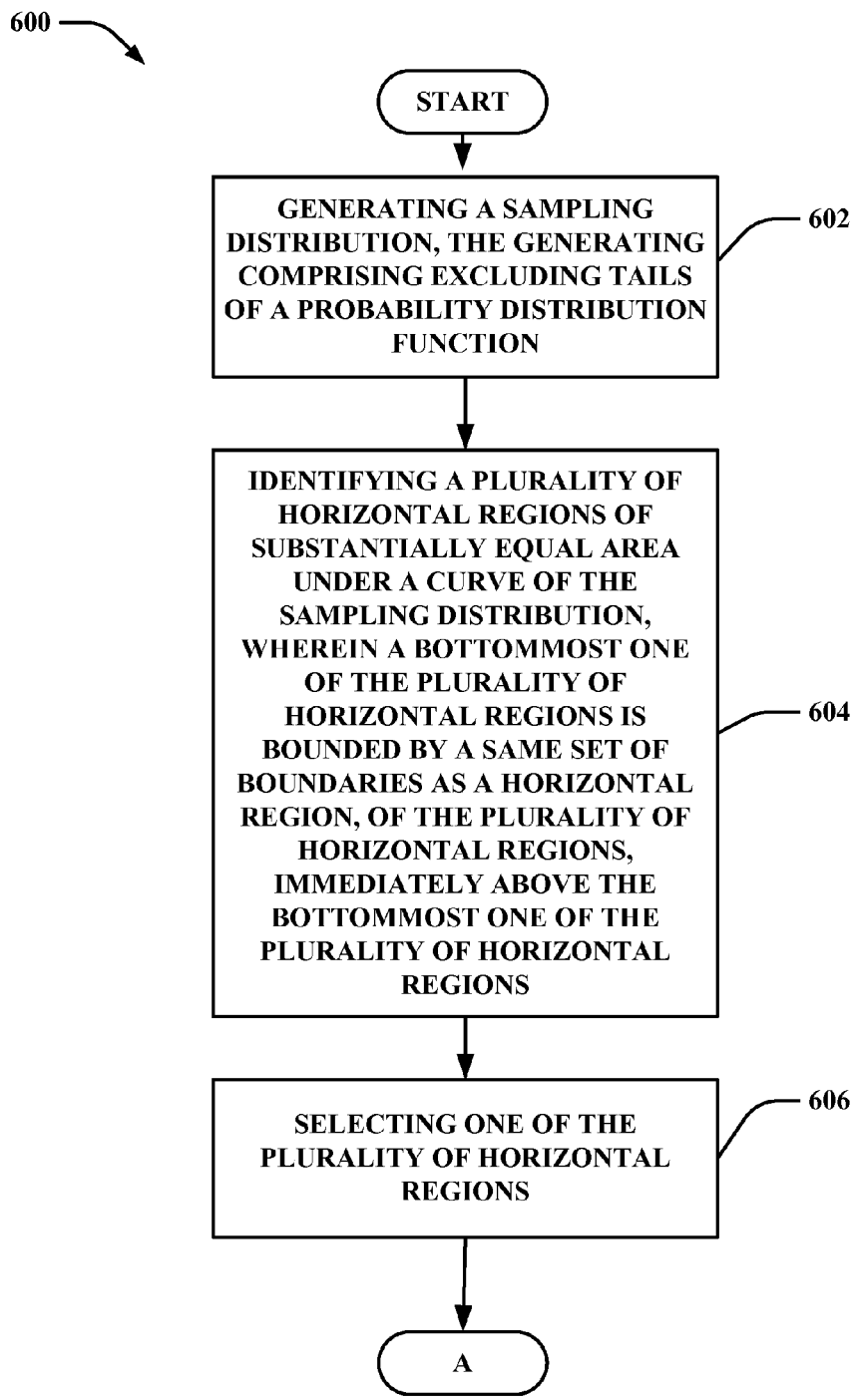
Figure 6B:
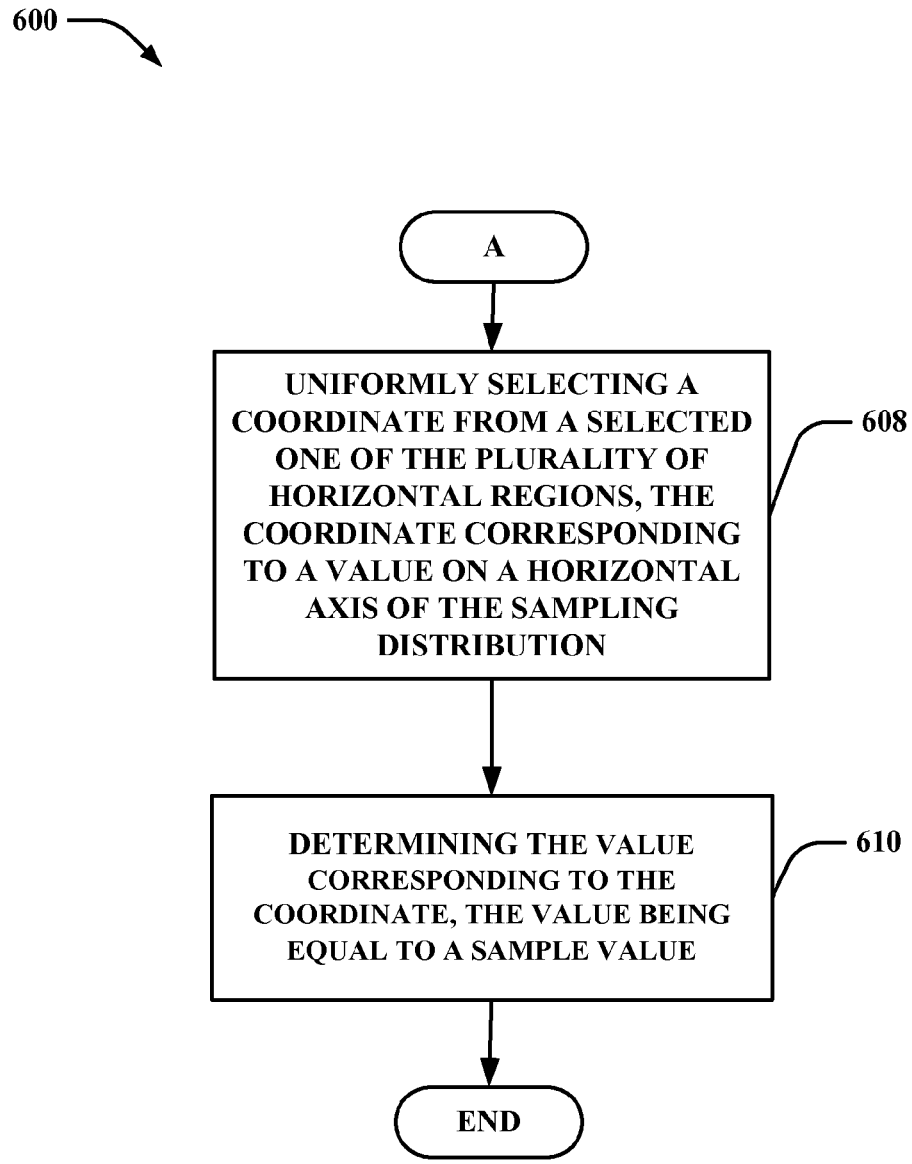

FIGS. 5, 6A and 6B are illustrations of exemplary flow diagrams of methods for facilitating random number generation for computation of a hash.

Turning first to FIG. 5, at 502, method 500 can include generating a sampling distribution of a weighted combination of a number of uniform distributions (e.g., using the WD generation component 200). At 504, method 500 can include obtaining a sample value from the sampling distribution (e.g., using the WD generation component 200). In some embodiments, although not shown, method 500 can include generating a hash based on the sample value (e.g., using the hash generation component 204).

Turning now to FIG. 6A, method 600 can provide further detail of an embodiment for generating the random number for use in computing the hash. The generation can be based on use of one or more values within an area under a curve of a PDF having a bounded interval from a first value to a second value. At 602, method 600 can include generating the sampling distribution to exclude the tails of the PDF (e.g., using the WD generation component 200). By generating the sampling distribution to exclude the tails of the PDF (e.g., as shown at the updated boundary 310 of FIG. 3), the random number selected in 612 below has a high probability of being under the curve of the sampling distribution and a rejection step (e.g., rejecting the random number selecting because the number is not under the curve, and re-sampling) can be avoided. At 604, method 600 can include identifying horizontal regions of substantially equal area under a curve of the sampling distribution (e.g., using the WD generation component 200). The bottommost horizontal region can be bounded by the same set of boundaries as the horizontal region immediately above the bottommost region.

At 606, method 600 can include selecting one of the horizontal regions (e.g., using the WD generation component 200).

Continuing the method 600 at FIG. 6B, at 608, method 600 can include selecting a coordinate from the selected horizontal region (e.g., using the WD generation component 200). In some embodiments, the selection of the coordinate can be uniform selection. At 610, method 600 can include determining a value corresponding to the coordinate, the value is assigned to be the sample value (e.g., using the WD generation component 200). With reference to FIG. 3, the coordinate can be a value of the x coordinate in some embodiments.

Figure 7:
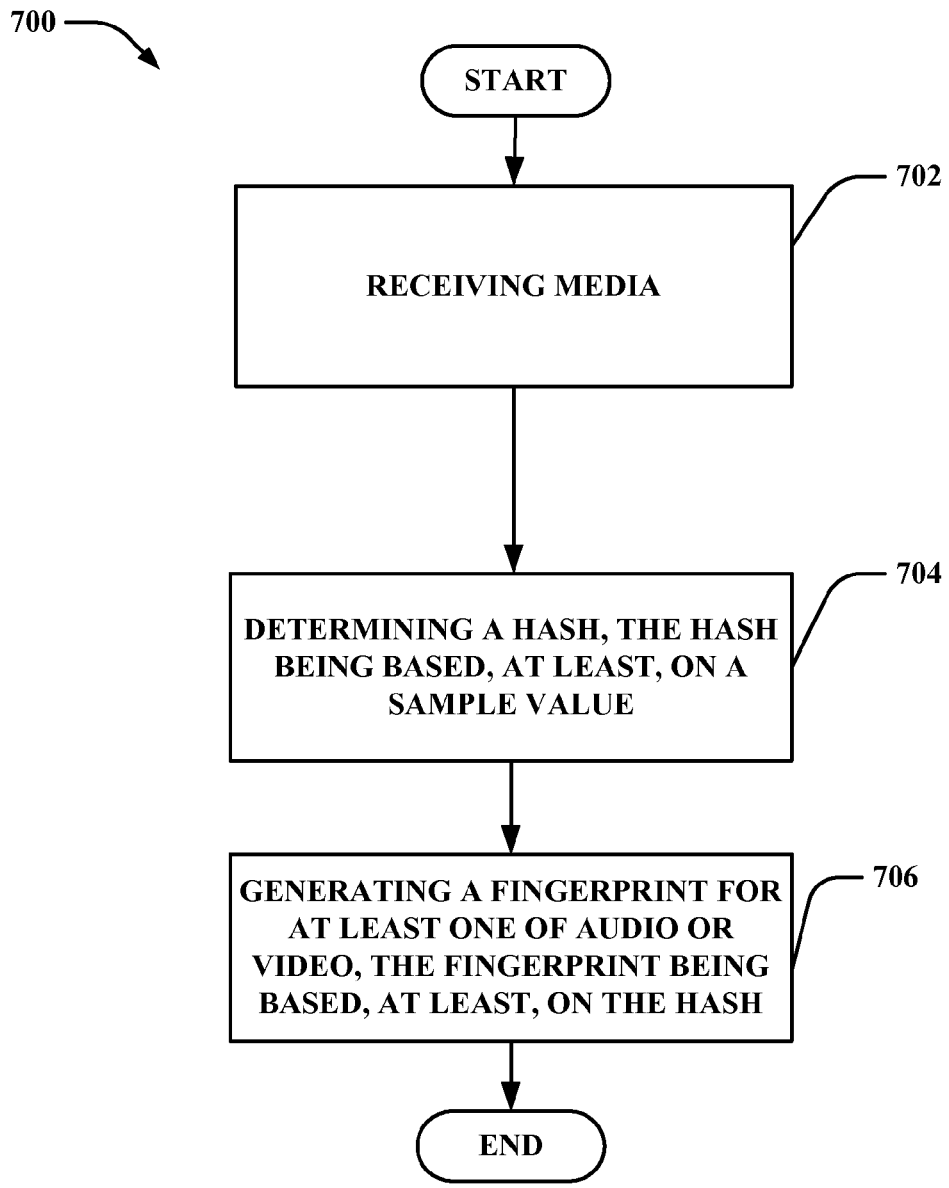
FIG. 7 is an illustration of an exemplary flow diagram of a method facilitating video fingerprinting employing a hash for video or audio.

FIG. 7 is an illustration of an exemplary flow diagram facilitating video fingerprinting. At 702, method 700 can include receiving media (e.g., using the communication component 400 of MF system 106'). The media can be or include an image, audio and/or video. At 704, method 700 can include determining a hash (e.g., using the fingerprinting component 402). The hash can be based, at least, on a computed sample value. Computing the sample value can include generating a sampling distribution (e.g., using the RNG system 102"). The generation of the sampling distribution can include excluding the tails of a PDF. Computing the sample value can also include: identifying horizontal regions of substantially equal area under a curve of the sampling distribution (e.g., using the RNG system 102"). A bottommost one of the horizontal regions can be bounded by the same set of boundaries as the horizontal region immediately above the bottommost horizontal region (e.g., using the RNG system 102"). Computing the sample value can also include: selecting one of the plurality of horizontal regions; and selecting a coordinate from a selected one of the plurality of horizontal regions (e.g., using the RNG system 102"). In some embodiments, the selection can be a random selection of the coordinate. In some embodiments, the coordinate can correspond to a value on a horizontal axis of the sampling distribution. Computing the sample value can also include determining the value corresponding to the coordinate (e.g., using the RNG system 102"). The value corresponding to the coordinate can be assigned to be the sample value. After computation of the hash, at 706, method 700 can include computing an image descriptor of an image or a video and/or generating a fingerprint for media (audio and/or video) based on the hash (e.g., using the fingerprinting component 402).

Figure 8:
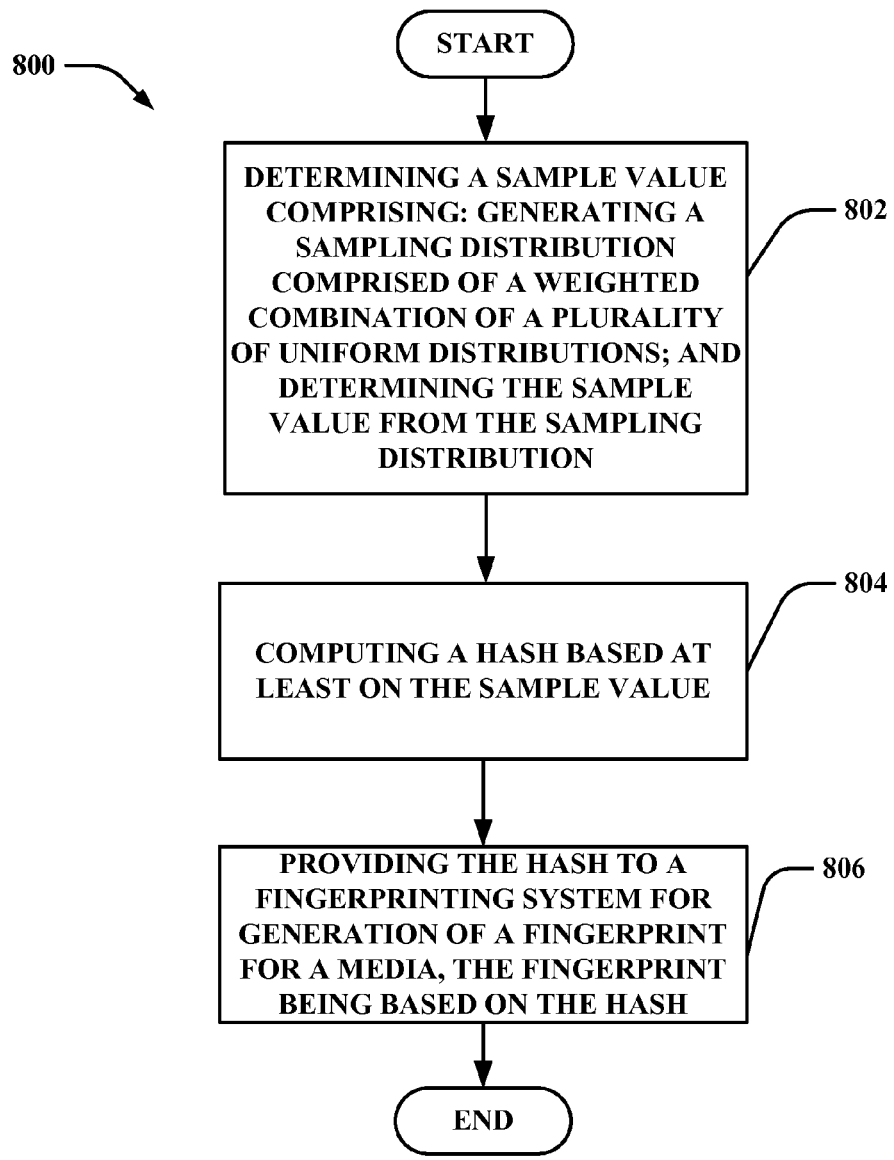
FIG. 8 is an illustration of an exemplary flow diagram of a method for facilitating random number generation for computation of a hash for video or audio.

FIG. 8 is an illustration of an exemplary flow diagram of a method for facilitating random number generation for computation of a hash. At 802, method 800 can include determining a sample value. In some embodiments, the determining can include: generating a sampling distribution comprised of a weighted combination of a plurality of uniform distributions; and determining the sample value from the sampling distribution. At 804, method 800 can include computing a hash based at least on the sample value. At 806, method 800 can include providing the hash to a fingerprinting system for generation of a fingerprint for a media, the fingerprint being based on the hash.

In some embodiments, the sampling distribution, $Q(x)$, can be generated to follow $P(x)$ as closely as possible by minimizing the divergence between $Q(x)$ and $P(x)$, which can be performed by maximizing Equation 4.

$$\int P(x) \log Q(x) dx \qquad \text{(Equation 4)}$$

The maximum may be $-\infty$ when $Q(x)$ has bounded support, since bounded support makes $Q(x)=0$ for values outside a certain interval, yielding $P(x) \log Q(x) = -\infty$ for those values of x, as long as $P(x)>0$ everywhere. An alternative is to make the range of x bounded by, for example, ignoring tails of $P(x)$ (i.e. add the restriction that $U<x<V$).

In another embodiment, other loss functions on $P(x)$ and $Q(x)$ can be used. For example, a large number of random values $x_i$ can be sampled from $P(x)$. Equation 5 can then be maximized.

$$\sum_i \log(Q(x_i)) \qquad \text{(Equation 5)}$$

In yet another embodiment, the $L_1$ or $L_2$ distance between $P(x)$ and $Q(x)$ can be minimized. The L1 and L2 variables can represent the Manhattan and Euclidean distances, respectively. In another embodiment, the Bhattacharya similarity integral shown in Equation 6 can be maximized.

$$\int \sqrt{(P(x)Q(x))} dx \qquad \text{(Equation 6)}$$

The optimizations can be performed using a variety of methods, including, but not limited to, gradient (or sub-gradient) methods, or Expectation-Maximization algorithms.

Exemplary Networked and Distributed Environments

One of ordinary skill in the art can appreciate that the various embodiments described in this disclosure can be implemented in connection with any computer or other client or server device, which can be deployed as part of a computer network or in a distributed computing environment, and can be connected to any kind of data store where media may be found. In this regard, the various embodiments described in this disclosure can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 9:
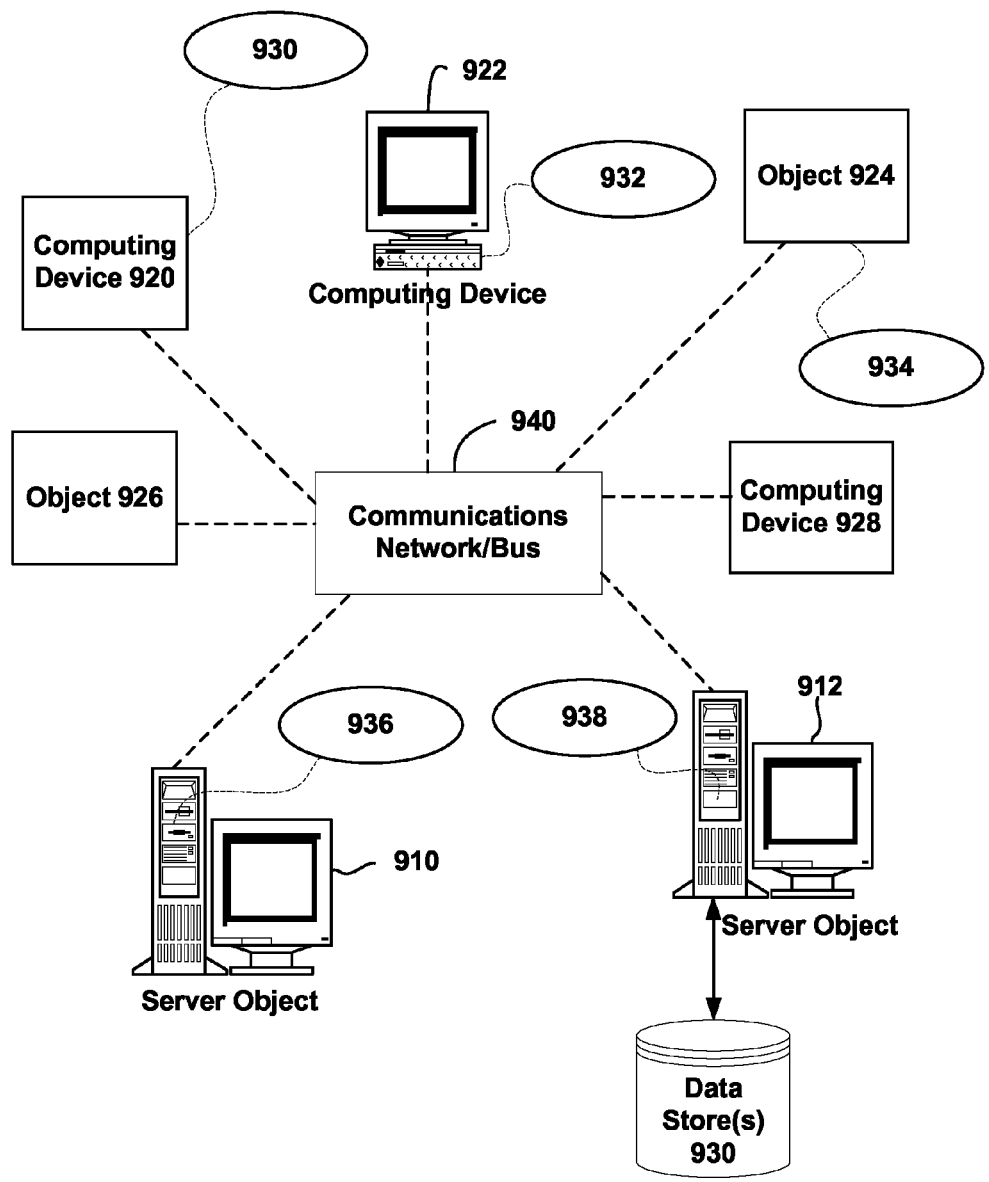
FIG. 9 is an illustration of a schematic diagram of an exemplary networked or distributed computing environment for implementing one or more embodiments described in this disclosure.

FIG. 9 provides a schematic diagram of an exemplary networked or distributed computing environment in which embodiments described in this disclosure can be implemented. The distributed computing environment includes computing objects 910, 912, etc. and computing objects or devices 920, 922, 924, 926, 928, etc., which can include programs, methods, data stores, programmable logic, etc., as represented by applications 930, 932, 934, 936, 938. It can be appreciated that computing objects 910, 912, etc. and computing objects or devices 920, 922, 924, 926, 928, etc. can include different devices, such as personal digital assistants (PDAs), audio/video devices, mobile phones, MPEG-1 Audio Layer 3 (MP3) players, personal computers, laptops, tablets, etc.

Each computing object 910, 912, etc. and computing objects or devices 920, 922, 924, 926, 928, etc. can communicate with one or more other computing objects 910, 912, etc. and computing objects or devices 920, 922, 924, 926, 928, etc. by way of the communications network 940, either directly or indirectly. Even though illustrated as a single element in FIG. 9, communications network 940 can include other computing objects and computing devices that provide services to the system of FIG. 9, and/or can represent multiple interconnected networks, which are not shown. Each computing object 910, 912, etc. or computing objects or devices 920, 922, 924, 926, 928, etc. can also contain an application, such as applications 930, 932, 934, 936, 938, that might make use of an application programming interface (API), or other object, software, firmware and/or hardware, suitable for communication with or implementation of the various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The client can be a member of a class or group that uses the services of another class or group. A client can be a computer process, e.g., roughly a set of instructions or tasks, that requests a service provided by another program or process. A client can utilize the requested service without having to know all working details about the other program or the service itself.

As used in this application, the terms "component," "module," "system," and the like are intended to refer to a computer-related entity, either hardware, software, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between two or more computers. In addition, these components can execute from various computer-readable storage media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

In a client/server architecture, particularly a networked system, a client can be a computer that accesses shared network resources provided by another computer, e.g., a server. In the illustration of FIG. 9, as a non-limiting example, computing objects or devices 920, 922, 924, 926, 928, etc. can be thought of as clients and computing objects 910, 912, etc. can be thought of as servers where computing objects 910, 912, etc. provide data services, such as receiving data from client computing objects or devices 920, 922, 924, 926, 928, etc., storing of data, processing of data, transmitting data to client computing objects or devices 920, 922, 924, 926, 928, etc., although any computer can be considered a client, a server, or both, depending on the circumstances. Any of these computing devices can process data, or request transaction services or tasks that can implicate the techniques for systems as described in this disclosure for one or more embodiments.

A server can be typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to the techniques described in this disclosure can be provided standalone, or distributed across multiple computing devices or objects.

In a network environment in which the communications network/bus 940 can be the Internet, for example, the computing objects 910, 912, etc. can be Web servers, file servers, media servers, etc. with which the client computing objects or devices 920, 922, 924, 926, 928, etc. communicate via any of a number of known protocols, such as the hypertext transfer protocol (HTTP). Computing objects 910, 912, etc. can also serve as client computing objects or devices 920, 922, 924, 926, 928, etc., as can be characteristic of a distributed computing environment.

Exemplary Computing Device

Figure 10:
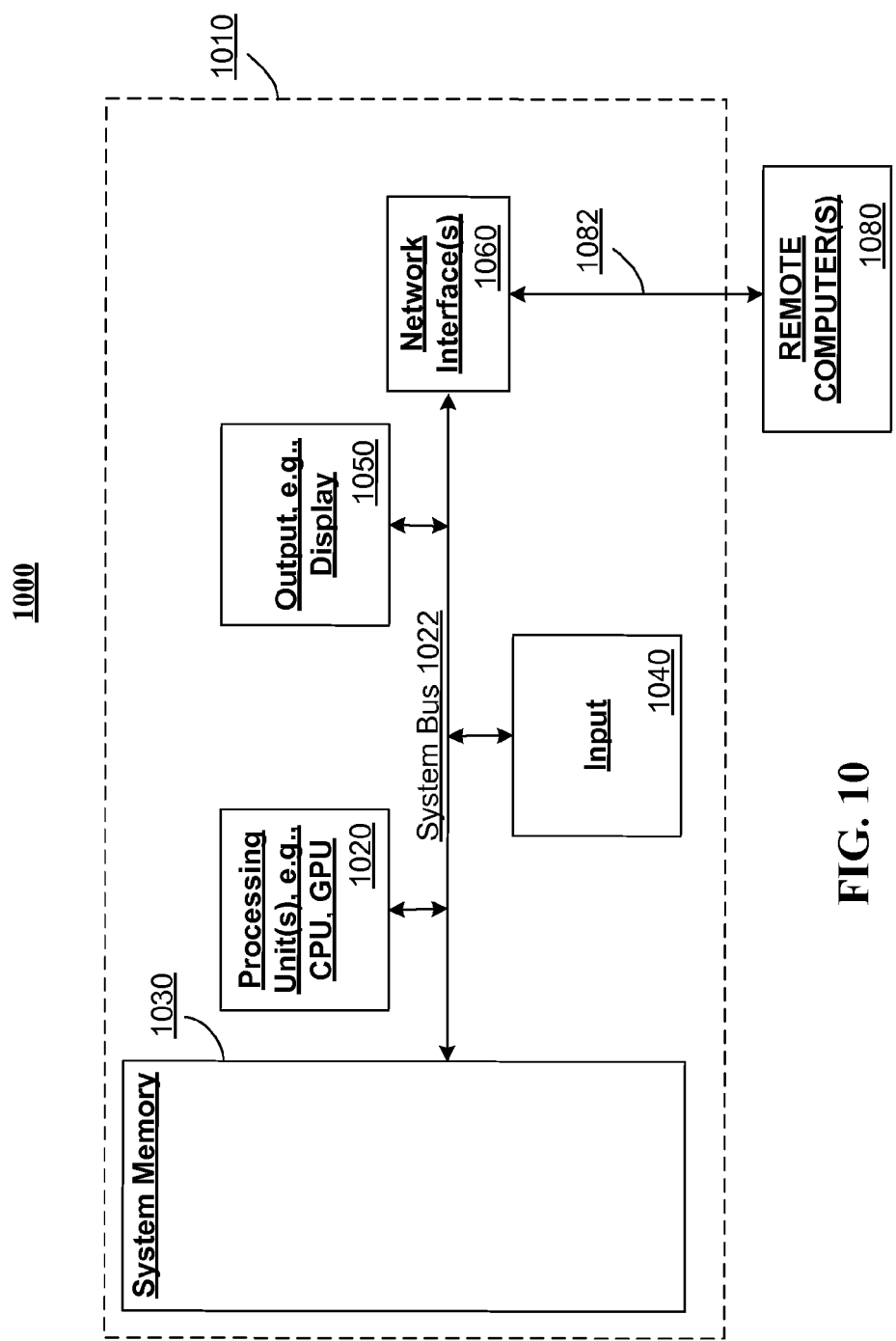
FIG. 10 is an illustration of a schematic diagram of an exemplary computing environment for implementing one or more embodiments described in this disclosure.

As mentioned, advantageously, the techniques described in this disclosure can be applied to any suitable device. It is to be understood, therefore, that handheld, portable and other computing devices and computing objects of all kinds are contemplated for use in connection with the various embodiments, i.e., anywhere that a device may wish to read or write transactions from or to a data store. Accordingly, the below remote computer described below in FIG. 10 is but one example of a computing device. Additionally, a suitable server can include one or more aspects of the below computer, such as a media server or other media management server components.

Although not required, embodiments can be partly implemented via an operating system, for use by a developer of services for a device or object, and/or included within application software that operates to perform one or more functional aspects of the various embodiments described in this disclosure. Software can be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 10 thus illustrates an example of a suitable computing environment 1000 in which one or aspects of the embodiments described in this disclosure can be implemented, although as made clear above, the computing environment 1000 is only one example of a suitable computing environment and is not intended to suggest any limitation as to scope of use or functionality. Neither is the computing environment 1000 to be interpreted as having any dependency or requirement relating to any one or combination of components illustrated in the exemplary computing environment 1000.

With reference to FIG. 10, an exemplary computing environment 1000 for implementing one or more embodiments includes a computing device in the form of a computer 1010 is provided. Components of computer 1010 can include, but are not limited to, a processing unit 1020, a memory 1030, and a system bus 1022 that couples various system components including the system memory to the processing unit 1020.

Computer 1010 typically includes a variety of computer readable media and can be any available media that can be accessed by computer 1010. The memory 1030 can include computer storage media in the form of volatile and/or nonvolatile memory such as read only memory (ROM) and/or random access memory (RAM). By way of example, and not limitation, memory 1030 can also include an operating system, application programs, other program modules, and program data.

A user can enter commands and information into the computer 1010 through input devices 1040, non-limiting examples of which can include a keyboard, keypad, a pointing device, a mouse, stylus, touchpad, touch screen, trackball, motion detector, camera, microphone, joystick, game pad, scanner, video camera or any other device that allows the user to interact with the computer 1010. A monitor or other type of display device can be also connected to the system bus 1022 via an interface, such as output interface 1050. In addition to a monitor, computers can also include other peripheral output devices such as speakers and a printer, which can be connected through output interface 1050.

The computer 1010 can operate in a networked or distributed environment using logical connections to one or more other remote computers, such as remote computer 1080. The remote computer 1080 can be a personal computer, a server, a router, a network PC, a peer device or other common network node, or any other remote media consumption or transmission device, and can include any or all of the elements described above relative to the computer 1010. The logical connections depicted in FIG. 10 include a network 1082, such local area network (LAN) or a wide area network (WAN), but can also include other networks/buses e.g., cellular networks.

As mentioned above, while exemplary embodiments have been described in connection with various computing devices and network architectures, the underlying concepts can be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques detailed in this disclosure. Thus, embodiments in this disclosure are contemplated from the standpoint of an API (or other software object), as well as from a software or hardware object that implements one or more aspects described in this disclosure. Thus, various embodiments described in this disclosure can have aspects that are wholly in hardware, partly in hardware and partly in software, as well as in software.

Computing devices typically include a variety of media, which can include computer-readable storage media and/or communications media, in which these two terms are used in this disclosure differently from one another as follows. Computer-readable storage media can be any available storage media that can be accessed by the computer, can be typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, electrically erasable programmable read only memory (EEPROM), flash memory or other memory technology, compact disc read only memory (CD-ROM), digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal (e.g., a carrier wave or other transport mechanism) and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

It is to be understood that the embodiments described in this disclosure can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described in this disclosure, or a combination thereof.

When the embodiments are implemented in software, firmware, middleware or microcode, program code or code segments, they can be stored in a machine-readable medium (or a computer-readable storage medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described in this disclosure can be implemented with modules or components (e.g., procedures, functions, and so on) that perform the functions described in this disclosure. The software codes can be stored in memory units and executed by processors. A memory unit can be implemented within the processor or external to the processor, in which case it can be communicatively coupled to the processor via various structures.

The word "exemplary" is used in this disclosure to mean serving as an example, instance, or illustration. For the avoidance of doubt, the subject matter disclosed in this disclosure is not limited by such examples. In addition, any aspect or design described in this disclosure as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

What has been described above includes examples of one or more embodiments. It is, of course, not possible to describe every conceivable combination of components or methodologies for purposes of describing the aforementioned embodiments, but one of ordinary skill in the art can recognize that many further combinations and permutations of various embodiments are possible. Accordingly, the described embodiments are intended to embrace all such alterations, modifications and variations that fall within the spirit and scope of the appended claims.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components can be combined into a single component providing aggregate functionality or divided into several separate sub-components, and that any one or more middle layers, such as a management layer, can be provided to communicatively couple to such sub-components in order to provide integrated functionality. Any components described in this disclosure can also interact with one or more other components not specifically described in this disclosure but generally known by those of skill in the art.

In view of the exemplary systems described above methodologies that can be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks can occur in different orders and/or concurrently with other blocks from what is depicted and described in this disclosure. Where non-sequential, or branched, flow is illustrated via flowchart, it can be appreciated that various other branches, flow paths, and orders of the blocks, can be implemented which achieve the same or a similar result. Moreover, not all illustrated blocks can be required to implement the methodologies hereinafter.

In addition to the various embodiments described in this disclosure, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described in this disclosure, and similarly, storage can be effected across a plurality of devices. The invention is not to be limited to any single embodiment, but rather can be construed in breadth, spirit and scope in accordance with the appended claims.

What is claimed is:

1. A method facilitating media fingerprinting, comprising:
employing a microprocessor to execute computer executable components stored within a memory to perform the following:
determining a sample value comprising:
determining the sample value from a sampling distribution, wherein the determining the sample value from the sampling distribution comprises:
selecting one of a plurality of regions under a curve of the sampling distribution; and
selecting a coordinate from a selected one of the plurality of regions, the coordinate corresponding to a value on an axis of the sampling distribution.

2. The method of claim 1, wherein the regions are substantially horizontal regions.

3. The method of claim 1, wherein the method further comprises:
computing a hash based at least on the sample value; and
providing the hash to a fingerprinting system for generation of a fingerprint for a media, the fingerprint being based on the hash.

4. The method of claim 1, wherein the plurality of regions are of substantially equal area, and wherein a bottommost one of the plurality of regions is bounded by a same set of boundaries as a region, of the plurality of regions, immediately above the bottommost one of the plurality of regions.

5. The method of claim 4, wherein $$\left(\frac{1}{K}\right)\sum_{k=1}^{\infty} I(u_k < x < v_k)/(v_k - u_k)$$

approximates a target probability distribution.

6. The method of claim 5, wherein the target probability distribution is at least one of $$P(x) = Xe^{-X} \text{ or } P(x) = \frac{1}{\sqrt{2\pi}} e^{(-x^2)/2}.$$

7. The method of claim 1, wherein the determining the sample value further comprises:
    determining the value corresponding to the coordinate, the value being substantially equal to the sample value.

8. The method of claim 1, wherein the sampling distribution is equal to $$Q(x) = (1/K)\sum_{k=1}^{\infty} I(u_k < x < v_k)/(v_k - u_k).$$

9. A fingerprinting system, comprising:
    a memory that stores computer executable components; and
    a microprocessor that executes the following computer executable components stored in the memory:
        a communication component that receives media; and
        a fingerprinting component that generates a fingerprint for the media, the fingerprint being based on a hash, and the fingerprinting component also employing a random number generation system that computes the hash, computation of the hash comprising:
            generation of a sampling distribution comprised of a weighted combination of a plurality of uniform distributions;
            selection of a sample value based on the sampling distribution, wherein the selection comprises identification of a plurality of horizontal regions of substantially equal area under a curve of the sampling distribution, wherein a bottommost one of the plurality of horizontal regions is bounded by a same set of boundaries as a horizontal region, of the plurality of horizontal regions, immediately above the bottommost one of the plurality of horizontal regions; and
            generation of the hash based, at least, on the sample value.

10. The system of claim 9, wherein the selection of the sample value further comprises:
    selection of one of the plurality of horizontal regions;
    uniform selection of a coordinate from a selected one of the plurality of horizontal regions, the coordinate corresponding to a value on a horizontal axis of the sampling distribution; and
    determination of the value corresponding to the coordinate, the value being substantially equal to a sample value.

11. The system of claim 9, wherein the media is video.

12. The system of claim 9, wherein the media is audio.

13. A method for facilitating random number generation for computation of a hash, comprising:
    employing a microprocessor to execute computer executable components stored within a memory to perform the following:
        generating a sampling distribution comprised of a weighted combination of a plurality of uniform distributions, wherein the sampling distribution is equal to $$Q(x) = (1/K)\sum_{k=1}^{\infty} I(u_k < x < v_k)/(v_k - u_k);$$

and
    obtaining a sample value from the sampling distribution.

14. The method of claim 13, wherein $$\left(\frac{1}{K}\right)\sum_{k=1}^{\infty} I(u_k < x < v_k)/(v_k - u_k)$$

approximates a target probability distribution.

15. The method of claim 14, wherein the target probability distribution is at least one of $$P(x) = Xe^{-X} \text{ or } P(x) = \frac{1}{\sqrt{2\pi}} e^{(-x^2)/2}.$$

16. The method of claim 13, wherein generating the sampling distribution further comprises excluding tails of a target probability distribution.

17. The method of claim 13, wherein the obtaining the sample value comprises:
    identifying a plurality of horizontal regions of substantially equal area under a curve of the sampling distribution, wherein a bottommost one of the plurality of horizontal regions is bounded by a same set of boundaries as a horizontal region, of the plurality of horizontal regions, immediately above the bottommost one of the plurality of horizontal regions;
    selecting one of the plurality of horizontal regions;
    uniformly selecting a coordinate from a selected one of the plurality of horizontal regions, the coordinate corresponding to a value on a horizontal axis of the sampling distribution; and
    determining the value corresponding to the coordinate, the value being equal to a sample value.

18. The method of claim 17, wherein the target probability distribution is a Gaussian distribution.

19. The method of claim 18, wherein the horizontal axis is an axis on which tails of the target probability distribution are excluded in identifying the plurality of horizontal regions.

20. The method of claim 13, further comprising generating a hash based on the sample value.

21. A system that facilitates random number generation for computation of a hash, comprising:
    a memory that stores computer executable components; and
    a microprocessor that executes the following computer executable components stored in the memory:

a weighted distribution (WD) generation component that:
  generates a sampling distribution comprised of a weighted combination of a plurality of uniform distributions; and
  obtains a sample value from the sampling distribution; and
a probability distribution function (PDF) generation component that generates a target probability distribution.

22. The system of claim 21, wherein the sampling distribution is equal to $$Q(x) = (1/K)\sum_{k=1}^{\infty} KI(u_k < x < v_k)/(v_k - u_k).$$

23. The system of claim 22, wherein $$\left(\frac{1}{K}\right)\sum_{k=1}^{\infty} I(u_k < x < v_k)/(v_k - u_k)$$

approximates a target probability distribution.

24. The system of claim 23, wherein the target probability distribution is at least one of $$P(x) = Xe^{-X} \text{ or } P(x) = \frac{1}{\sqrt{2\pi}} e^{(-x^2)/2}.$$

25. The system of claim 21, wherein the target probability distribution is a Gaussian distribution.

26. The system of claim 21, wherein the WD generation component obtains the sample value by:
  identification of a plurality of horizontal regions of substantially equal area under a curve of the sampling distribution, wherein a bottommost one of the plurality of horizontal regions is bounded by a same set of boundaries as a horizontal region, of the plurality of horizontal regions, immediately above the bottommost one of the plurality of horizontal regions;
  selection of one of the plurality of horizontal regions;
  uniform selection of a coordinate from a selected one of the plurality of horizontal regions, the coordinate corresponding to a value on a horizontal axis of the sampling distribution; and
  determination of the value corresponding to the coordinate, the value being equal to a sample value.

27. The system of claim 21, further comprising a hash generation component that generates a hash based on the sample value.

28. The system of claim 27, further comprising a fingerprinting system that:
  receives the hash; and
  generates a fingerprint for at least one of audio or video, the fingerprint being based, at least, on the hash.

29. A non-transitory computer storage medium storing computer-executable instructions that, when executed on a processor, cause the processor to perform operations comprising:
  generating a sampling distribution comprised of a weighted combination of a plurality of uniform distributions, wherein the sampling distribution is generated based, at least, on a target probability distribution; and
  obtaining a sample value from the sampling distribution.

30. The non-transitory computer storage medium of claim 29, wherein the sampling distribution is equal to $$Q(x) = (1/K)\sum_{k=1}^{\infty} KI(u_k < x < v_k)/(v_k - u_k).$$

31. The non-transitory computer storage medium of claim 30, wherein $$\left(\frac{1}{K}\right)\sum_{k=1}^{\infty} I(u_k < x < v_k)/(v_k - u_k)$$

approximates a target probability distribution.

32. The non-transitory computer storage medium of claim 31, wherein the target probability distribution is at least one of $$P(x) = Xe^{-X} \text{ or } P(x) = \frac{1}{\sqrt{2\pi}} e^{(-x^2)/2}.$$

33. The non-transitory computer storage medium of claim 29, wherein the target probability distribution is a Gaussian distribution.

34. The non-transitory computer storage medium of claim 29, wherein the sampling distribution is generated based, at least, on excluding tails of the target probability distribution.

* * * * *